United States Patent

Guiles et al.

[11] Patent Number: 6,056,844
[45] Date of Patent: May 2, 2000

[54] TEMPERATURE-CONTROLLED INDUCTION HEATING OF POLYMERIC MATERIALS

[75] Inventors: Marvin A. Guiles, Stow; Ross Haghighat, Chelmsford; Anant Singh, Burlington; Rochelle Lerner, Framingham, all of Mass.

[73] Assignee: Triton Systems, Inc., Chelmsford, Mass.

[21] Appl. No.: 09/090,865

[22] Filed: Jun. 5, 1998

Related U.S. Application Data

[60] Provisional application No. 60/048,919, Jun. 6, 1997.

[51] Int. Cl.[7] .................................................. B32B 31/24
[52] U.S. Cl. ............................ 156/272.4; 156/275.7; 156/307.1; 156/309.6; 219/633; 219/634; 252/62.54; 252/62.63
[58] Field of Search .................................. 156/94, 272.2, 156/272.4, 273.9, 275.7, 307.1, 307.3, 308.2, 309.6; 219/633, 634; 428/113, 301.4; 252/62.54, 62.56, 62.62, 62.63

[56] References Cited

U.S. PATENT DOCUMENTS

| | | | |
|---|---|---|---|
| 2,393,541 | 1/1946 | Kohler | 156/272.4 |
| 3,391,846 | 7/1968 | White . | |
| 3,461,014 | 8/1969 | James . | |
| 4,476,184 | 10/1984 | Lubowitz et al. | 428/288 |
| 4,969,968 | 11/1990 | Leatherman . | |
| 5,129,977 | 7/1992 | Leatherman . | |
| 5,198,053 | 3/1993 | Duncan . | |
| 5,240,542 | 8/1993 | Miller et al. . | |
| 5,248,864 | 9/1993 | Kodokian . | |
| 5,304,269 | 4/1994 | Jacaruso | 156/94 |
| 5,340,428 | 8/1994 | Kodokian . | |
| 5,378,879 | 1/1995 | Monovoukas | 129/634 |
| 5,391,595 | 2/1995 | Clark, Jr. et al. . | |
| 5,481,799 | 1/1996 | McGaffigan . | |
| 5,538,581 | 7/1996 | Gallant . | |
| 5,603,795 | 2/1997 | Paulauskas et al. . | |
| 5,643,390 | 7/1997 | Don et al. | 156/307.1 |

*Primary Examiner*—Michael W. Ball
*Assistant Examiner*—Michael A Tolin
*Attorney, Agent, or Firm*—James Creighton Wray; Meera P. Narasimhan

[57] ABSTRACT

The present invention provides new polymer induction bonding technology. Induction heating technologies are utilized to weld, forge, bond or set polymer materials. The invention provides controlled-temperature induction heating of polymeric materials by mixing ferromagnetic particles in the polymer to be heated. Temperature control is obtained by selecting ferromagnetic particles with a specific Curie temperature. The ferromagnetic particles will heat up in an induction field, through hysteresis losses, until they reach their Curie temperature. At that point, heat generation through hysteresis loss ceases. This invention is applicable to bonding thermoplastic materials, wherein only the area to be bonded has ferromagnetic particles in it; bonding of thermoset composites, which have been processed with a layer of thermoplastic material on one side; curing of thermoset adhesives or composite resins; or consolidating thermoplastic composites.

10 Claims, 5 Drawing Sheets

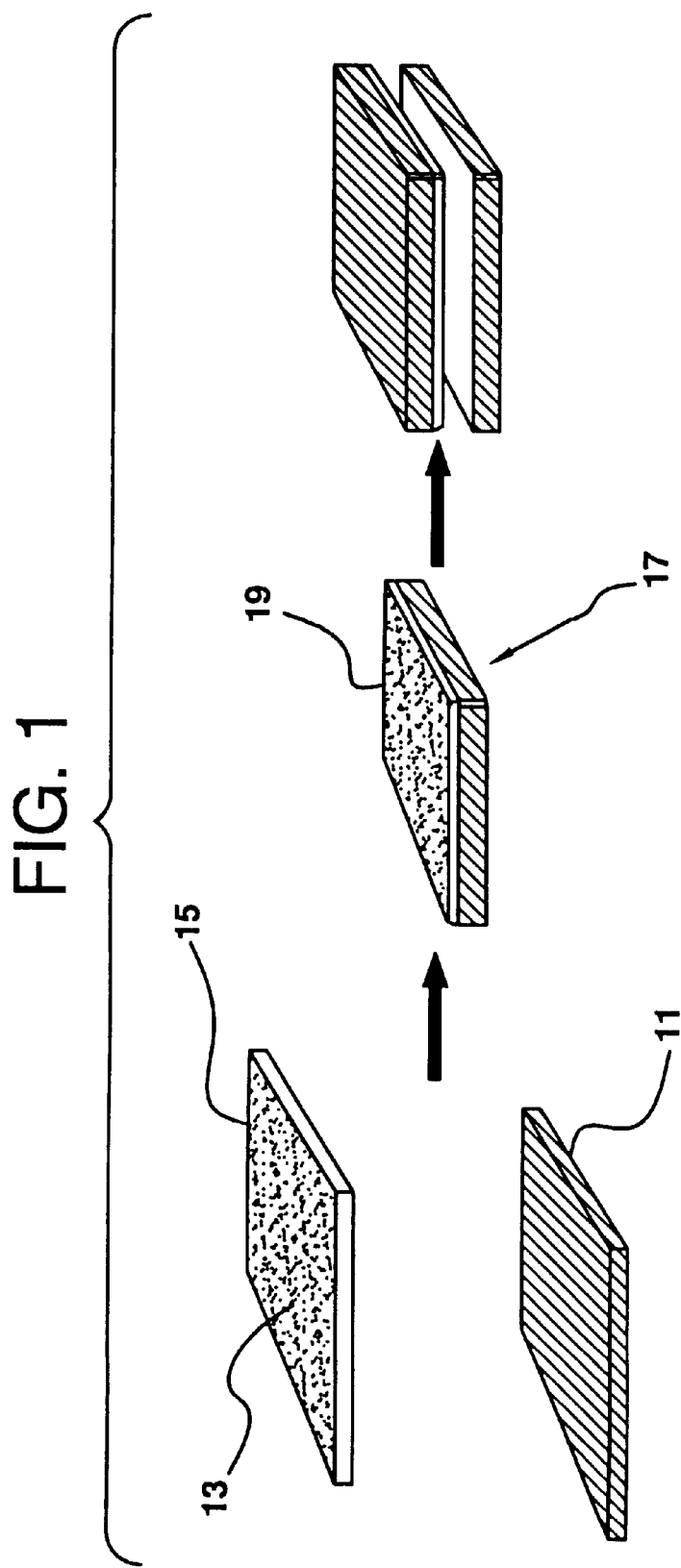

FIG. 3

Smart Susceptor Test Results

| Material | Type | Geometry | Curie Temp °C | Heating Results 275 kHz | Heating Results 4MHz |
|---|---|---|---|---|---|
| $Co_2Ba_2Fe_{12}O_{22}$ | ferromagnetic | powder | 345 | 60 - 65°C | 340 - 370°C |
| $Fe_3O_4$ (44 micron) | ferromagnetic | powder | 585 | 350°C | 600°C |
| $Fe_3O_4$ (840 micron) | ferromagnetic | powder | 585 | 470°C | not tested |
| $SrFe_{12}O_{19}$ #1 | ferromagnetic | powder | 450 | 60°C | not tested |
| $SrFe_{12}O_{19}$ #2 | ferromagnetic | powder | 450 | 88°C | not tested |

FIG. 5
Smart Susceptor Test Results for Filled Films

| Material | Geometry | Thickness (mils) | Curie Temp °C | Heating Results | | | |
|---|---|---|---|---|---|---|---|
| | | | | 275 kHz | 4 MHz | | 6.5 MHz |
| $SrFe_{12}O_{19}$ #1 | 30 % filled PSF film | 4.0 | 450 | | | | 149 °C |
| $SrFe_{12}O_{19}$ #2 (1-2 micron) | 30 % filled PSF film | 4.0 | 450 | | | | 343 °C |
| $SrFe_{12}O_{19}$ #2 (1-2 micron) | 30 % filled PSF film | 10.0 | 450 | | | | 371 °C |
| $SrFe_{12}O_{19}$ #2 | 30 % filled PSF film | 8.0 | 450 | | | | 360 °C |
| $Co_2Ba_2Fe_{12}O_{22}$ | 30 % filled PSF film | 4.0 | 345 | | 109 °C | | |
| $Co_2Ba_2Fe_{12}O_{22}$ | 30 % filled PSF film | 8.0 | 345 | | | | 249 °C |
| $Co_2Ba_2Fe_{12}O_{22}$ (<1 micron) | 30 % filled PSF film | 4.0 | 345 | | | | 243-249 °C |
| $Co_2Ba_2Fe_{12}O_{22}$ (<1 micron) | 30 % filled PSF film | 8.0 | 345 | | | | 288-302 °C |
| $Co_2Ba_2Fe_{12}O_{22}$ (<1 micron) | 30 % filled PSF film | 10.0 | 345 | | | | 288-302 °C |
| $Fe_3O_4$ (840 micron) | 30 % filled PSF film | 4.0 | 585 | 50 °C | | | |
| $Fe_3O_4$ (44 micron) | 10 % filled PSF film | 4.0 | 585 | 38 °C | | | |
| $Fe_3O_4$ (44 micron) | 30 % filled PSF film | 4.0 | 585 | 210 °C | | | >371 °C |

TEMPERATURE-CONTROLLED INDUCTION HEATING OF POLYMERIC MATERIALS

This application claims the benefit of U.S. Provisional Application Ser. No. 60/048,919, filed Jun. 6, 1997.

BACKGROUND OF THE INVENTION

As composite and polymer materials become more widely used in military and commercial vehicles and structures, more reliable cost effective methods of fabrication and repair are required for those structures. Current needs exist for a more reliable, expedient and cost effective method of joining fiber reinforced composite components and thermoplastic polymer components. New bonding methods must be useful in manufacturing as well as amenable to expedient and effective in-the-field repair. State-of-the-art induction heating techniques can provide very fast heating and bonding rates, but exhibit poor control of bond-line temperatures achieved.

SUMMARY OF THE INVENTION

The present invention provides new polymer induction bonding technology to offer a unique solution to the problem. Induction heating technologies are utilized to weld, forge, bond or set polymer materials. The invention provides controlled-temperature induction heating of polymeric materials by mixing ferromagnetic particles in the polymer to be heated. Temperature control is obtained by selecting ferromagnetic particles with a specific Curie temperature. The ferromagnetic particles will heat up in an induction field, through hysteresis losses, until they reach their Curie temperature. At that point, heat generation through hysteresis loss ceases. This invention is applicable to bonding thermoplastic materials, wherein only the area to be bonded has ferromagnetic particles in it; bonding of thermoset composites, which have been processed with a layer of thermoplastic material on one side; curing of thermoset adhesives or composite resins; or consolidating thermoplastic composites.

Induction heating of a material occurs when an induction coil, which generates a magnetic field, is placed near the material and heats a susceptor, such as a metal screen or powder, within the material to be heated. The invention focuses on improving the induction heating process by optimizing the susceptor design for effective fusion bonding or welding of thermoplastic layers. An innovative susceptor concept is provided. The invention uses ferromagnetic particles, "smart susceptors", which generate heat through hysteresis losses. These innovative susceptors have the unique feature of "turning off" when they reach their Curie temperature.

Ferromagnetism in a ferromagnetic material disappears at the Curie temperature as thermal oscillations overcome the orientation due to exchange interaction, resulting in a random grouping of the atomic particles. When a ferromagnetic material is placed in an electromagnetic field, the hysteresis losses in the material cause its temperature to rise, eventually reaching its Curie temperature. Upon reaching its Curie temperature, the material crystal lattice undergoes a dimensional change, causing a reversible loss of magnetic dipoles. Once the magnetic dipoles are lost, the ferromagnetic properties cease, thus halting further heating. Among the important parameters in this process are the following.

1) The size and shape of the hysteresis loop of the material is controlled. A hard magnet has a much larger loop, representing a larger amount of heat generated per cycle.

2) The amount of ferromagnetic material used is controlled. In the case of a thermoplastic weld material, the volume fraction of the ferromagnetic phase present and the thickness of the weld material play a direct role in the temperature achieved within the thermoplastic polymer.

3) Heating mechanisms inherent in the material may provide additional heat. If other induction heating mechanisms exist in the material, such as eddy currents or dielectric losses, and they generate a significant fraction of the total heat, the temperature control of the hysteretic heating of the ferromagnetic material may not be complete.

4) Particle size of the ferromagnetic powder is controlled. Particle size affects heat transfer to the thermoplastic weld material.

By manipulating these parameters, "smart" ferromagnetic materials are chosen so as to maximize the hysteresis component of heating, thus optimizing control of the temperature during induction heating.

These and further and other objects and features of the invention are apparent in the disclosure, which includes the above and ongoing written specification, with the claims and the drawings.

BRIEF DESCRIPTION OF THE DRAWINGS

FIG. 1 depicts one method of bonding composites using "smart" susceptors.

FIG. 3 summarizes the test results on various powders at 275 kHz and 4 MHZ induction machines.

FIG. 5 summarizes the test results on various filled polysulfone film "smart susceptors."

DETAILED DESCRIPTION OF THE PREFERRED EMBODIMENTS

Figure 2A:
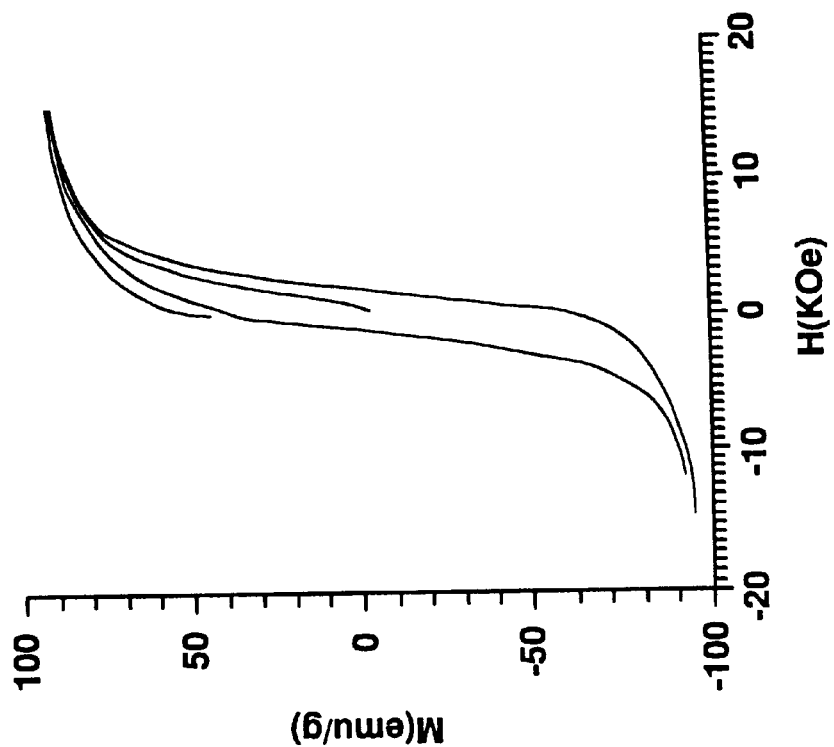
FIGS. 2A and 2B show hysteresis loops for $SrFe_{12}O_{19}$ #1 and $SrFe_{12}O_{19}$ #2 and $Co_2Ba_2Fe_{12}O_{22}$ powders.

As shown in FIG. 1, induction heating provides a unique solution to the problem of effective bonding of plastics, for example, thermoset composite armor.

A fiber reinforced thermoset matrix composite material 11 is co-cured with a thin layer of a thermoplastic material 15. During processing, a co-cure occurs between the thermoplastic (TP) and thermoset (TS) materials across the TP/TS interface, resulting in a strong bond between the two. The cured thermoset composite material 17 has a thermoplastic layer 19 which may subsequently be fusion bonded to another thermoplastic material or to another thermoset material co-cured with a thermoplastic layer.

Preferential heating of the thermoplastic bond area during fusion is achieved by induction heating of a susceptor material 13 placed in the bond interface. This technology is amenable to rapid field repair of composites, armor, for example, and is more cost effective in initial fabrication.

Magnetic induction heating occurs in magnetic or electrically conductive materials when they are subject to an applied alternating magnetic field. When a current-carrying body, or coil, is placed near another conductor, or susceptor material 13, the magnetic field caused by the current in the coil induces a current in the susceptor. In magnetic materials, hysteresis losses occur. In this case, the amount of energy available is proportional to area of flux vs. field intensity hysteresis curve and frequency of the alternating field. This mechanism exists as long as the temperature is kept below the Curie point of the material. At the Curie point, the material becomes nonferromagnetic.

Figure 2B:
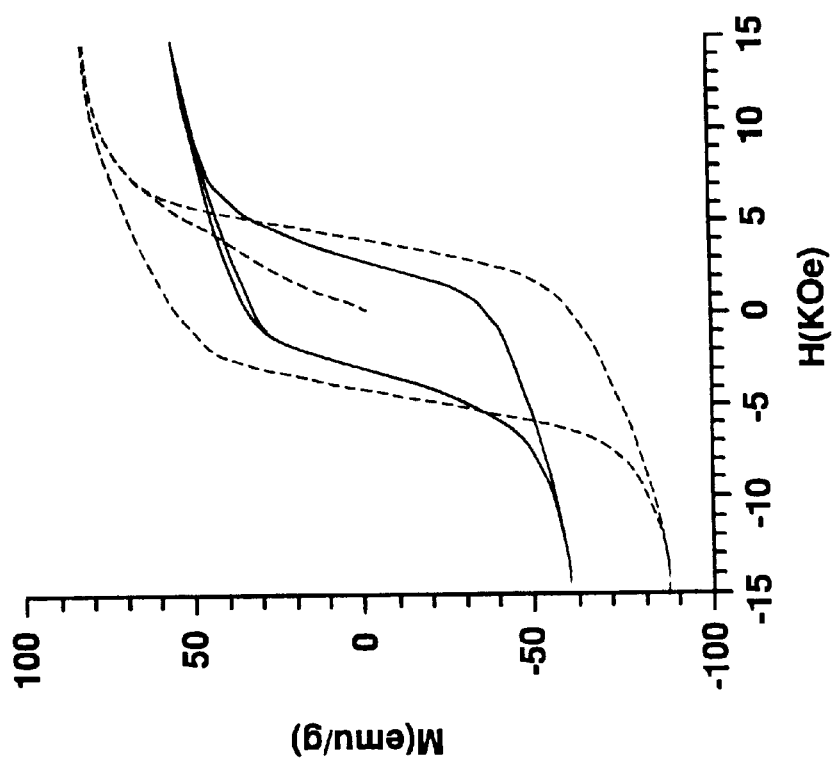

Comparisons of the hysteresis loops for $SrFe_{12}O_{19}$ #1 (Triton B) and $SrFe_{12}O_{19}$ #2 (Triton C) and $Co_2Ba_2Fe_{12}O_{22}$ powders are shown in FIGS. 2A and 2B. $SrFe_{12}O_{19}$ #1 and $SrFe_{12}O_{19}$ #2 are hard magnets, having wider hysteresis loops which generate more efficient heating.

FIG. 3 summarizes the results of the tests that have been performed on powders which were done with 275 kHz and 4 MHZ induction machines. One phenomena demonstrated is that frequencies in the order of 3–10 MHZ are preferred in order to expose the micron-sized particles to many oscillations per second thus rapidly developing the volume of heat required for reaching fusion temperature.

Figure 4A:
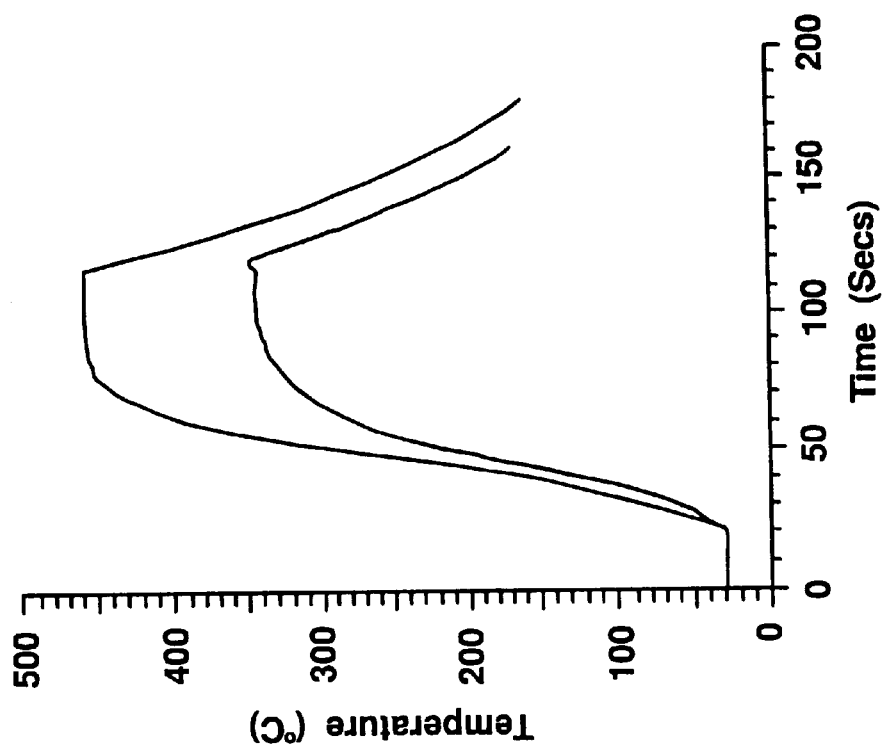
FIGS. 4A and 4B show time temperature curves for various powders at 275 kHz.
Figure 4B:
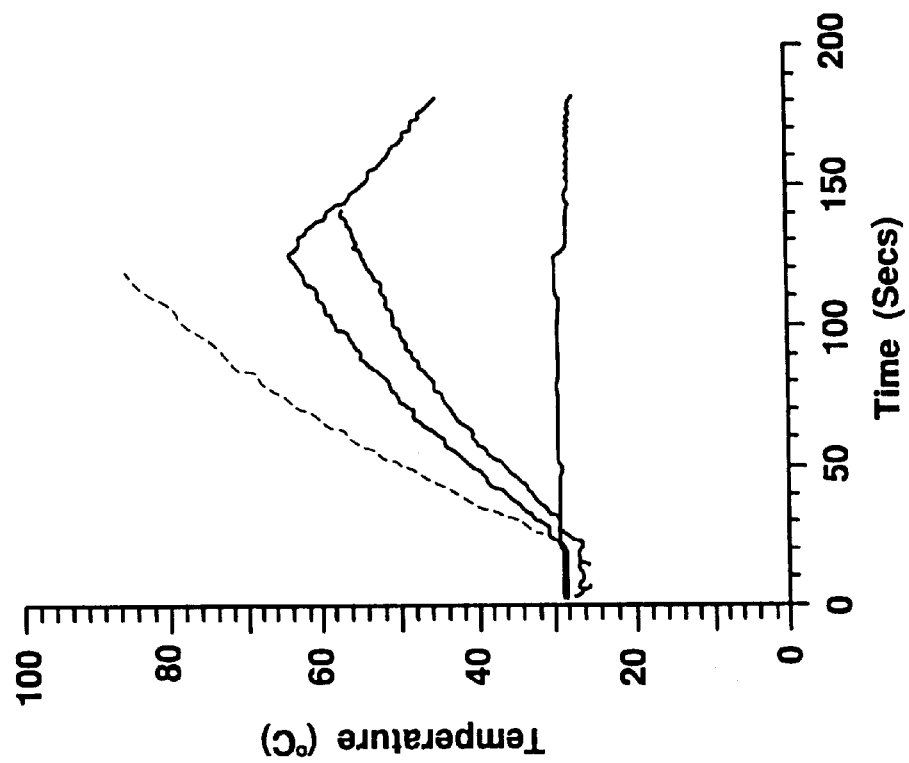

FIGS. 4A and 4B show the time/temperature curves for $SrFe_{12}O_{19}$ #1 (Triton B), $SrFe_{12}O_{19}$ #2 (Triton C), $Fe_3O_4$ (<44 micron), $Fe_3O_4$ (<840 micron), $Fe_2O_3$ and $Co_2Ba_2Fe_{12}O_{22}$ powders heated at 275 kHz. Though these particles did not reach their Curie temperature at 275 kHz, the curves show that a variety of heating rates are available by selecting different ferromagnetic powders.

FIG. 5 summarizes test results that have been performed on polysulfone films filled with various ferromagnetic powders. The data illustrates i) the need to use high frequencies in the range of 3–10 MHZ; ii) the effect of volume percent particles in the film; and iii) the effect of film thickness.

While the invention has been described with reference to specific embodiments, modifications and variations of the invention may be constructed without departing from the scope of the invention, which is defined in the following claims.

We claim:

1. A method of controlled temperature bonding comprising dispersing magnetic particles, selected from a group of ferromagnetic particles consisting of $SrFe_{12}O_{19}$ and $CO_2Ba_2Fe_{12}O_{22}$ particles, in a first thermoplastic material, applying an alternating induction field to the first thermoplastic material, heating the magnetic particles and thermoplastic material with hysteresis losses from the magnetic particles, flowing the thermoplastic material and bonding the first thermoplastic material with a second material, continuing the applying of the alternating field and ceasing heating of magnetic particles when the magnetic particles reach Curie temperature.

2. The method of claim 1, further comprising initially juxtaposing the first thermoplastic material with the second material.

3. The method of claim 1, further comprising initially placing the first thermoplastic material in an uncured state on an uncured thermoset material and cocuring the first thermoplastic material and the thermoset material.

4. The method of claim 3, further comprising initially juxtaposing the first thermoplastic material on the cocured thermoset material with the second material.

5. The method of claim 4, wherein the second material is a cocured second thermoset material with a cocured second thermoplastic material and wherein the bonding comprises flowing and bonding the first and second thermoplastic materials.

6. The method of claim 5, wherein the second thermoplastic material has magnetic particles embedded therein.

7. The method of claim 6, wherein the particles are embedded in adjacent surfaces of the first and second thermoplastic materials.

8. The method of claim 6, wherein the particles are embedded in a surface of the first or second thermoplastic material.

9. The method of claim 1, wherein the particles are from about 1 micron to about 840 microns.

10. The method of claim 1, wherein the applying comprises applying an alternating induction field at about 6–10 MHz.

* * * * *

UNITED STATES PATENT AND TRADEMARK OFFICE
CERTIFICATE OF CORRECTION

PATENT NO.    : 6,056,844
DATED         : May 2, 2000
INVENTOR(S)   : Marvin A. Guiles et al.

It is certified that error appears in the above-identified patent and that said Letters Patent is hereby corrected as shown below:

Column 1,
Line 7, insert the following paragraph, entitled "STATEMENT REGARDING FEDERALLY SPONSORED RESEARCH", before the paragraph entitled "BACKGROUND OF THE INVENTION":

-- STATEMENT REGARDING FEDERALLY SPONSORED RESEARCH
This invention was made with U.S. Government support under Contract No. DAAL01-98-C-0048 monitored and funded by the United States Army. The Government has certain rights in the invention. --

Column 3,
Line 37, delete "$CO_2Ba_2Fe_{12}O_{22}$" and insert -- $Co_2Ba_2Fe_{12}O_{22}$ -- therefor.

Signed and Sealed this

Twenty-eighth Day of October, 2003

JAMES E. ROGAN
*Director of the United States Patent and Trademark Office*